United States Patent
Hiranaka et al.

[11] Patent Number: 6,123,439
[45] Date of Patent: Sep. 26, 2000

[54] VEHICLE HEAD LAMP WITH A PROTECTED HIGH VOLTAGE CORD

[75] Inventors: Yukinobu Hiranaka; Akiyoshi Ozaki, both of Shizuoka, Japan

[73] Assignee: Koito Manufacturing Co., Ltd., Tokyo, Japan

[21] Appl. No.: 09/012,484

[22] Filed: Jan. 23, 1998

[30] Foreign Application Priority Data

Jan. 24, 1997 [JP] Japan .................................. 9-010990

[51] Int. Cl.$^7$ .................................................. B60Q 1/00
[52] U.S. Cl. ........................ 362/459; 362/465; 362/507; 362/512
[58] Field of Search .................................. 362/464, 465, 362/466, 467, 507, 512, 514, 513, 515, 519, 459; 174/36, 68.3, 103, 107

[56] References Cited

U.S. PATENT DOCUMENTS

| | | | |
|---|---|---|---|
| 2,875,322 | 2/1959 | Linder et al. | 362/467 |
| 5,107,405 | 4/1992 | Makita | 362/61 |
| 5,113,330 | 5/1992 | Makita | 362/265 |
| 5,118,990 | 6/1992 | Makita | 315/77 |
| 5,119,275 | 6/1992 | Makita | 362/61 |
| 5,140,504 | 8/1992 | Sato | 362/61 |
| 5,173,062 | 12/1992 | Uchida | 439/617 |
| 5,188,444 | 2/1993 | Makita et al. | 362/80 |
| 5,228,766 | 7/1993 | Makita et al. | 362/61 |
| 5,343,370 | 8/1994 | Ohashi et al. | 362/61 |
| 5,382,876 | 1/1995 | Sugasawa et al. | 315/82 |
| 5,390,088 | 2/1995 | Tsukada | 362/514 |
| 5,481,068 | 1/1996 | Norden | 174/36 |
| 5,521,010 | 5/1996 | Tanaka et al. | 428/379 |
| 5,584,559 | 12/1996 | Toda | 362/61 |
| 5,597,232 | 1/1997 | Ohashi et al. | 362/265 |
| 5,607,228 | 3/1997 | Ozaki et al. | 362/263 |

FOREIGN PATENT DOCUMENTS

| | | |
|---|---|---|
| 27 31 356 C2 | 4/1989 | Germany. |
| 41 39 905 A1 | 6/1993 | Germany. |
| 43 15 294 A1 | 11/1994 | Germany. |

Primary Examiner—Sandra O'Shea
Assistant Examiner—Ismael Negron
Attorney, Agent, or Firm—Sughrue, Mion, Zinn, Macpeak & Seas, PLLC

[57] ABSTRACT

A vehicle head lamp which includes: a lamp body having a front side being opened; a lens mounted on the front side of the lamp body; a discharging lamp; a reflector being disposed within a space defined by the lamp body and the lens while supporting the discharging lamp, the reflector being tiltable with respect to the lamp body; a discharging lamp unit supplying a discharging voltage to the discharging lamp; and a connecting member. The connecting member includes, a plural number of connection cords connecting the discharging lamp and the discharging lamp unit, wherein one of the connection cords is a high voltage cord to which a high voltage is applied, a protecting tube covering the high voltage cord, and a cylindrical member being conductive and flexible wherein the cylindrical member covers the protecting tube as well as covers connection cords which are not covered with the protecting tube.

13 Claims, 4 Drawing Sheets

VEHICLE HEAD LAMP WITH A PROTECTED HIGH VOLTAGE CORD

BACKGROUND OF INVENTION

The present invention relates to a vehicle head lamp. More particularly, the invention relates to a vehicle head lamp having a lamp body, a lens mounted on the front side of the lamp body, a reflector being disposed within a space defined by the lamp body and the lens while supporting a discharging lamp, the reflector being tiltable with respect to the lamp body, wherein a discharging lamp lighting unit supplies a discharging voltage to the discharging lamp through a plural number of connection cords, the vehicle head lamp being improved such that the connection cords are more flexible and a smooth tilting of the reflector is ensured.

In a known vehicle head lamp, a reflector supporting a light source is coupled with a lamp body by use of a leveling mechanism. The reflector is tilted with respect to the lamp body by operating the leveling mechanism to vary the aiming direction of the light beams emitted therefrom, viz., the direction in which the optical axis of the head lamp extends.

In the thus constructed vehicle head lamp, the light source supported by the reflector is usually a discharging lamp. Electric power is supplied to the discharging lamp from a discharging lamp lighting unit, through a plural number of connection cords.

A conventional connecting member including such connection cords is shown in FIG. 6.

As shown, each of the connection cords a is constructed such that a conductor b is covered with a cover layer c made of heat-resistant resin. Those connection cords a are disposed within the inner space of a protecting tube d made of rubber contained material. The protecting tube d is covered with a cylindrical member e formed by weaving conductive metal wires in a mesh. Thus, a connecting member f is formed with the connection cords a, protecting tube d and cylindrical member e.

The connecting member f is bent such that it meanders through the space between the lamp body and the reflector supported therein in a state that the connection cords a contained therein connect a discharging lamp (not shown) to a discharging lamp lighting unit placed outside the lamp body.

As described above, the connection cords a are disposed within the inner space of a protecting tube d made of rubber contained material. The reasons for this are: to protect the connection cords a against high temperature, and to prevent an attenuation of high tension pulses by spacing the connection cords a from the cylindrical member e. The reasons why the protecting tube d is covered with the cylindrical member e are: to prevent the protecting tube d from being damaged and to prevent the high frequency noise generated from the connection cords a from leaking outside.

The connecting member f is constructed such that the protecting tube d is fit into the cylindrical member en and the two connection cords a are both disposed within the protecting tube d. With the construction, it is necessary to design the protecting tube d so as to have a relatively large diameter. A flexibility of the connecting member f is reduced by the amount of the increase of the diameter.

In a case where the connecting member f is used, it is difficult to smoothly operate the leveling mechanism for tilting the reflector with respect to the lamp body because of a poor flexibility of the connecting member f.

The construction of the connecting member f has a further problem. Since the outside diameter of the protecting tube d is equal to the inside diameter of the cylindrical member e, it is difficult to insert the protecting tube d into the cylindrical member e.

One of the connection cords a is a high voltage cord, and connection cords are disposed side by side within the protecting tube d. Therefore, a high voltage applied to the high voltage cords adversely affects the durability of the other cord.

SUMMARY OF INVENTION

Accordingly, an object of the present invention is to solve the above problems of the conventional vehicle head lamp, and to ensure a smooth tilting of the reflector with respect to the lamp body.

To solve the above problems, according to the present invention, there is provided a vehicle head lamp comprising: a lamp body having a fornt side being opened; a lens mounted on the front side of the lamp body; a discharging lamp; a reflector being disposed within a space defined by the lamp body and the lens while supporting the discharging lamp, the reflector being tiltable with respect to the lamp body; a discharging lamp unit supplying a discharging voltage to the discharging lamp; and a connecting member including, a plural number of connection cords connecting the discharging lamp and the discharging lamp unit, wherein one of the connection cords is a high voltage cord to which a high voltage is applied, a protecting tube covering the high voltage cord, and a cylindrical member being conductive and flexible wherein the cylindrical member covers the protecting tube together with the remaining connection cords which are not covered with the protecting tube.

Furthermore, in the above described vehicle head lamp described above, the outside diameter of the high voltage cord is smaller than the inside diameter of the protecting tube.

Still further, in the above describided vehicle head lamp according to claim 1, the covering layers of the connection cords and/or the protecting tube is made of polyethylene.

With such a construction, the protecting tube having a small diameter may be used.

DETAILED DESCRIPTION OF PREFERRED EMBODIMENTS

The preferred embodiment of a vehicle head lamp, which is constructed according to the present invention, will be described with reference to the accompanying drawings.

A vehicle head lamp 1 includes an automatic leveling mechanism and is of the so called reflector movable type. To adjust an aiming direction of the light beams, a reflector is tiltable with respect to a lamp body by use of the leveling mechanism.

While the usual leveling mechanism adjusts the aiming direction through a manual operation of the related switch, the automatic leveling mechanism senses a tilt of the vehicle body when the vehicle is stopped or running by means of a vehicle height sensor, for example, and processes the tilt data from the sensor by a computer, and automatically adjusts the aiming direction of the light beams to the best aiming direction.

Figure 1:
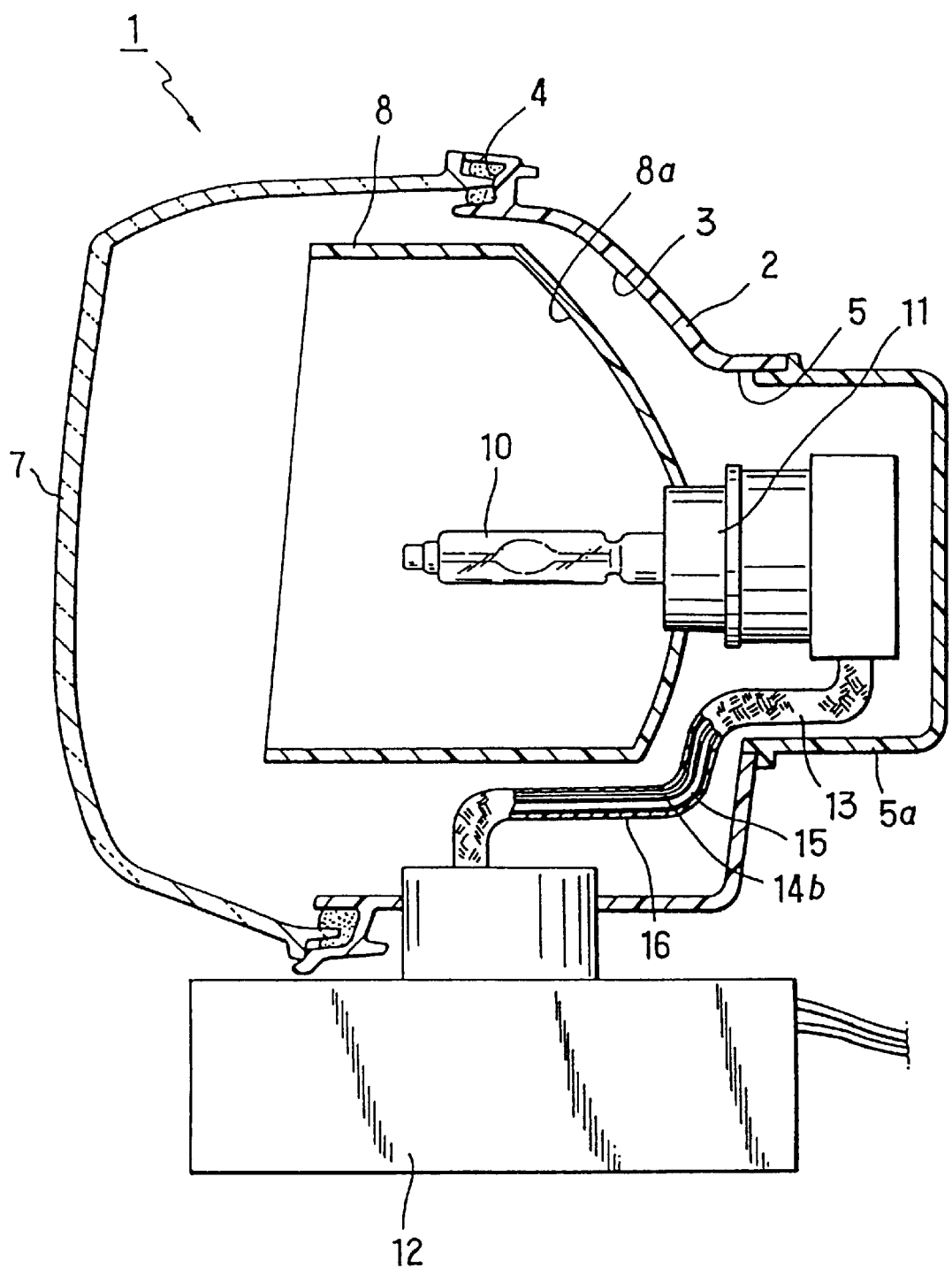
FIG. 1 is a longitudinal sectional view showing an embodiment of a vehicle head lamp according to the present invention, FIGS. 1 to 3 cooperatively showing the vehicle head lamp.
Figure 2:
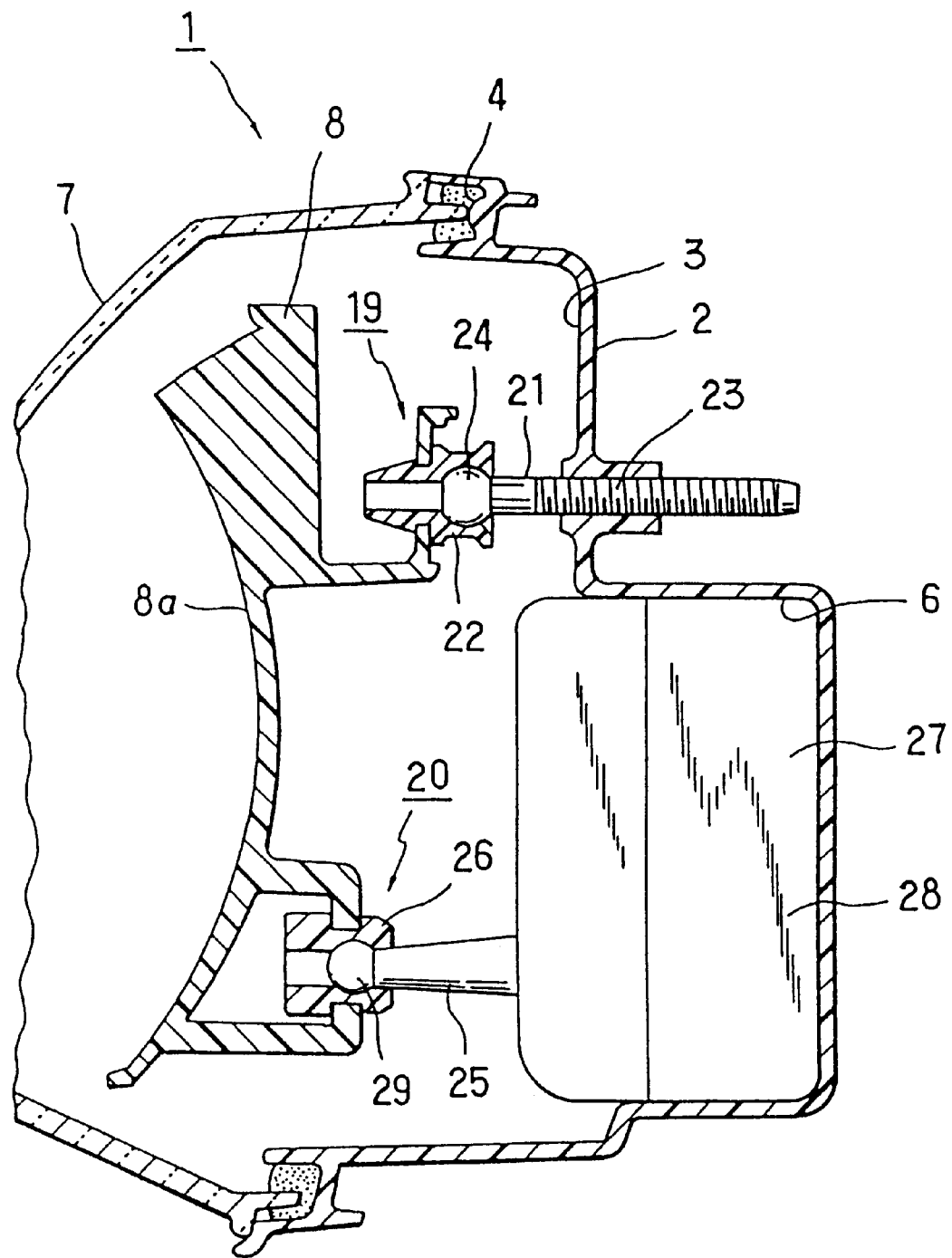
FIG. 2 is a sectional view showing cut along a line lying at another location of the vehicle head lamp.

The lamp body 2 includes a major portion 3 opened to the front. A mounting groove 4 is formed along the edge of the front opening defined by the major portion 3. A mounting hole 5 is bored in the central part of the rear end of the major portion 3 (FIG. 1). An actuator receiving portion 6, shaped like an U in cross section, is protruded rearward of the rear end of the lamp body 2. A leveling actuator to be described later is put in the actuator receiving portion 6.

A lens 7 is formed of a transparent glass or synthetic resin. The circumferential bottom edge of the lens 7 is fit into the mounting groove 4, which extends along the front opening edge of the major portion 3 of the lamp body 2.

A reflector 8 includes a major portion which has a curved surface 8a and is opened to the front. The curved surface 8a is processed to have a function to reflect light beams. The reflector 8 is disposed within a space defined by the lamp body 2 and the lens 7 in a state that it is tiltable with respect to the lamp body 2. A socket 11 is mounted at the central portion of the rear end of the reflector 8, and a discharging lamp 10 is applied to the socket 11. Light beams are emitted from the discharging lamp 10 and, reflected on the reflecting surface, or the curved surface 8a, toward the front of the lamp body 2.

A discharging lamp lighting unit 12 is mounted on the lower side of the lamp body 2. The discharging lamp lighting unit is electrically connected to the discharging lamp 10, which is set in the socket 11, by connection cords (to be described later) of a connection member 13.

Figure 3:
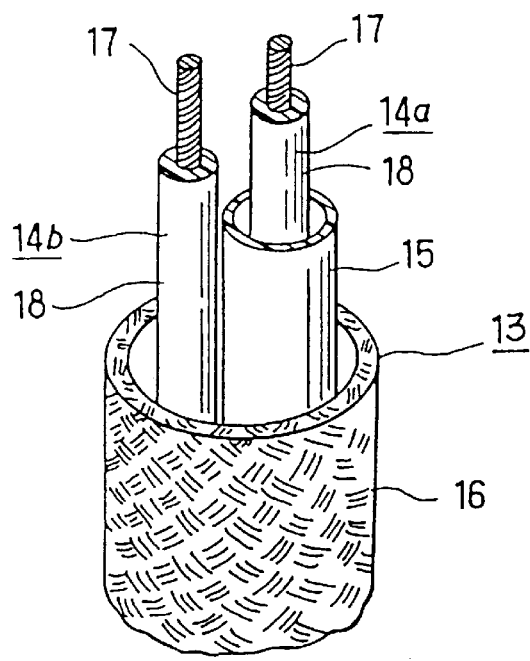
FIG. 3 is an enlarged, perspective view showing a connecting member.

The connecting member 13 is formed with connection cords 14a and 14b, a protecting tube 15 and a cylindrical member 16 (FIG. 3). Each of the connection cords 14a and 14b is formed with a conductor 17 and a covering layer 18 with which the conductor 17 is covered. Of those connection cords, the connection cord 14a is used as a high voltage cord to which a high voltage is applied.

The high voltage connection cord 14a is covered with a protecting tube 15 made of non-rigid polyethylene. The inside diameter of the protecting tube 15 is slightly larger than the outside diameter of the high voltage connection cord 14a, whereby a thin air layer is present between the high voltage connection cord 14a and the protecting tube 15 when the former is covered with the latter.

Usually, fluororubber is used for making the connection cords and the protecting tube to secure a good heat resistance. This material is hardened when temperature falls to below 0° C. to lose its flexibility. This nature presents a hindrance to a smooth leveling operation.

In this respect, it is noted that non-rigid polyethylene is used, in the present embodiment, for the covering layers 18 of the connection cords 14 and the protecting tube 15. This material keeps its flexibility even at such a low temperature. Therefore, the connection cords 14 and the protecting tube 15 are satisfactorily flexible or easily bendable if the temperature drops, and hence, permits a smooth leveling operation independently of temperature variation.

Figure 4:
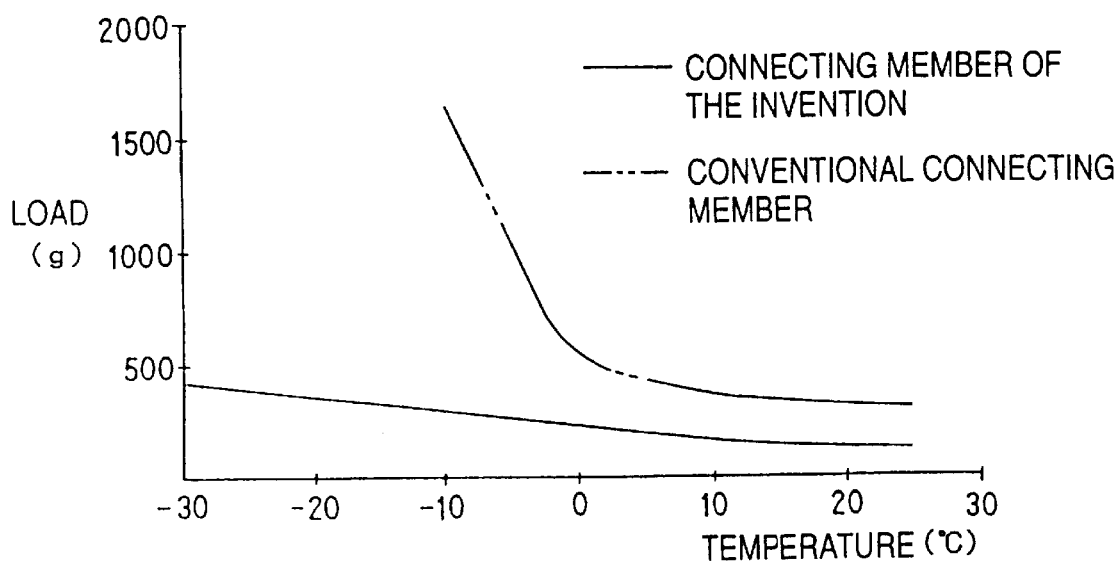
FIG. 4 is a graph comparatively showing temperature characteristics of the loads to the connecting members of the invention and the conventional one.

The temperature characteristics of the loads to the connecting members 13 of the invention and the conventional one are comparatively shown in the graph of FIG. 4. The connection cords and the protecting tubes of the connecting members used are made of fluororubber (The bendable nature becomes poor as the load becomes larger.).

The protecting tube 15, together with the connecting cord 14b, is covered with the flexible cylindrical member 16 formed by weaving conductive metal wires in a mesh.

The connecting member 13 is bent such that it meanders through the space between the lamp body 2 and the reflector 8 supported therein in a state that the connection cords 14a and 14b contained therein connect the discharging lamp 10 to a discharging lamp lighting unit 12 placed outside the lamp body 2.

A mounting cover 5a is inserted into the mounting hole 5 of the rear end of the lamp body 2 in a state that the connection cords 14 are thus connected (FIG. 1).

An aiming mechanism is located on the rear side of the reflector 8. The aiming mechanism includes two aiming adjusting means 19 located in the upper part within the lamp body and leveling adjusting means 20 located in the lower part.

The those aiming adjusting means 19 (only one aiming adjusting means is illustrated) are disposed horizontally spaced. Each of the aiming adjusting means 19 is formed with an adjusting screw 21 and a ball bearing 22. The adjusting screw 21 includes a threaded part 23 and a part spherical head 24 as the fore end of the screw. The threaded part 23 of the adjusting screw 21 is screwed into the rear end part 23 of the lamp body 2, and the part spherical head 24 is ball jointed with the ball bearing 22 that is supported at the upper part of the rear side of the reflector 8.

The leveling adjusting means 20 is formed with a coupling shaft 25 and a ball bearing 26. The coupling shaft 25 is extended from the front side of a main body 28 of a leveling actuator 27 located within the actuator receiving portion 6 of the lamp body 2. The fore end 2 of the coupling shaft 25 includes a spherical head 29, and this spherical head 29 is coupled with the ball bearing 26 in a ball joint fashion.

When the leveling actuator 27 is manually or automatically driven, the coupling shaft 25 is moved in its axial direction, and the reflector 8 is tilted about a line connecting the two aiming adjusting means 19, more exactly the joints of the part spherical heads 24 and the ball bearings 22.

To perform the aiming adjustment, one (or both the adjusting screws 21) is turned to change a distance between the joint of the aiming adjusting means 19 and the lamp body 2 and hence, to tilt the reflector 8 with respect to the lamp body 2.

In the vehicle head lamp 1 thus constructed, only the connection cord 14a, which is the voltage connection cord, is covered with the protecting tube 15. Therefore, the diameter of the protecting tube 15 is smaller than that of the conventional one. Use of the protecting tube 15 of small diameter provides a good flexibility of the connecting member 13. When the reflector 8 is tilted with respect to the lamp body 2 through the operation of the leveling mechanism, the connecting member 13 is easily bent to ensure a smooth tilting of the reflector 8.

The outside diameter of the protecting tube 15 is much smaller than the inside diameter of the cylindrical member 16. Therefore, it is easy to insert the protecting tube 15 into the cylindrical member 16. This provides an easy assembly operation.

The feature that only the high voltage connection cord 14a is covered with the protecting tube 15 improves the electrical insulation of the high voltage connection cord 14a, thereby lessening adverse effects on the other cord 14b and hence the degradation of the durability of the same.

The air layer present between the high voltage connection cord 14a and the protecting tube 15 further improves the electrical insulation of the this connection cord and enhances the cord durability by preventing degradation.

Figure 5:
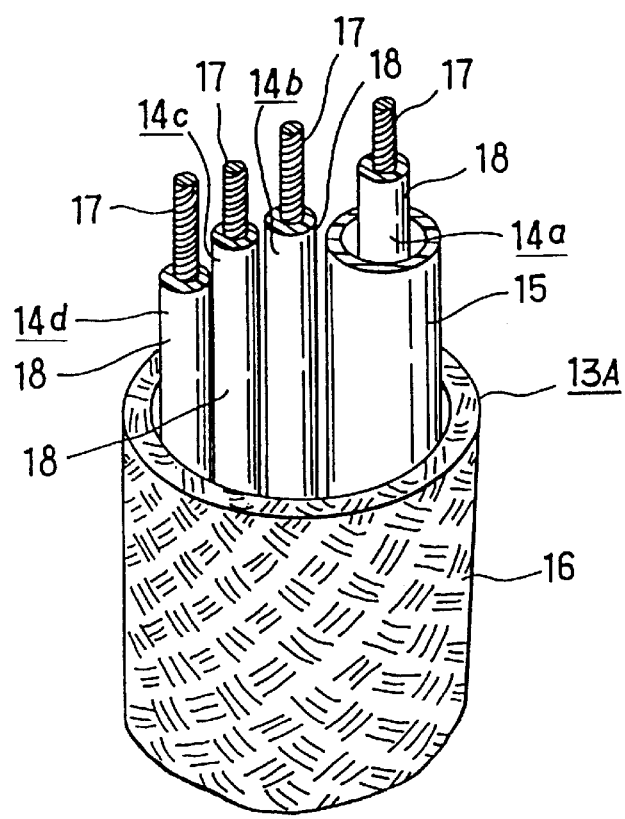
FIG. 5 is an enlarged, perspective view showing a modification of the connecting member.
Figure 6:
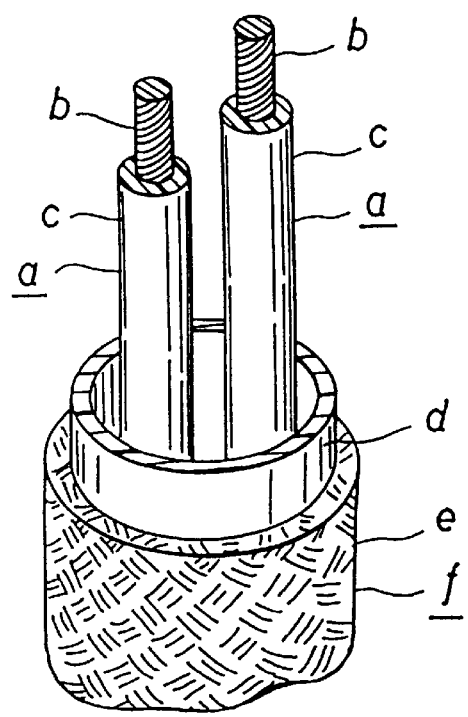
FIG. 6 is an enlarged, perspective view showing a conventional connecting member.

A modification (denoted as 13A) of the connecting member is shown in FIG. 5.

The connecting member 13A is formed with four connector cords 14a to 14d, a protecting tube 15 and a cylindrical member 16. The conductors 17 of the connection cords 14c and 14d are covered with covering layers 18, which are made of non-rigid polyethylene as were the connection cords 14a and 14b of the embodiment mentioned above. The connection cords 14c and 14d are used for fail-safe purposes. That is, those cords are grounded, and if the discharging lamp 10 accidentally comes out of the socket 11, a current with a high voltage by-passes the high voltage connection cord 14a and flows to the cords 14c and 14d and to ground.

The high voltage connection cord 14a is covered with a protecting tube 15 made of non-rigid polyethylene. The inside diameter of the protecting tube 15 is slightly larger than the outside diameter of the high voltage connection cord 14a. The protecting tube 15, together with the connection cords 14b, 14c and 14d, is covered with the flexible cylindrical member 16 formed by weaving conductive metal wires in a mesh.

In the connecting member 13A, the high voltage connection cord 14a is covered with the protecting tube 15. The provision of the protecting tube increases the distance between the high voltage connection cord 14a and the connection cord 14d. Provision of the grounded connection cord 14d little decreases the high voltage applied to the high voltage connection cord 14a.

In the modification mentioned above, the inside diameter of the protecting tube 15 is slightly larger than the outside diameter of the high voltage connection cord 14a, whereby a thin air layer is present between the high voltage connection cord 14a and the protecting tube 15 when the former is covered with the latter. If required, the high voltage connection cord 14a may be tightly covered with the protecting tube 15 so as not to form an air layer therebetween.

As seen from the foregoing description, a vehicle head lamp constructed according to the present invention has a lamp body, a lens mounted on the front side of the lamp body, a reflector being disposed within a space defined by the lamp body and the lens while supporting a discharging lamp, the reflector being tiltable with respect to the lamp body, wherein a discharging lamp unit supplies a discharging voltage to the discharging lamp through a plural number of connection cords. The vehicle head lamp is improved such that, of the plural number of connection cords, the cord to which a high voltage is applied (referred to as a high voltage cord) is covered with a protecting tube, and that the protecting tube, together with the remaining connection cords not covered with the same, are covered with a cylindrical member being conductive and flexible. With such a construction, a protecting tube having a small diameter may be used and is well bendable. The reflector is smoothly tilted with respect to the lamp body through the operation of the leveling mechanism.

The outside diameter of the protecting tube is much smaller than the inside diameter of the cylindrical member. Therefore, it is easy to insert the protecting tube into the cylindrical member. This provides an easy assembly operation.

The feature that only the high voltage cord is covered with the protecting tube improves the electrical insulation of the high voltage cord, thereby lessening adverse effects on the other cords and hence prevents the degradation of durability in the same.

Furthermore, the outside diameter of the high voltage cord is slightly smaller than the inside diameter of the protecting tube. Therefore, a thin air layer is present between the high voltage cord and the protecting tube when the former is covered with the latter. The air layer present between the high voltage cord and the protecting tube further improves the electrical insulation of the high voltage cord and enhances cord durability by preventing degradation.

Still further, the covering layers of the connection cords and/or the protecting tube is made of polyethylene. Therefore, when temperature drops, the connection cords and/or the protecting tube are less hardened and hence, are satisfactorily bendable when a drive force is applied thereto in the automatic leveling operation.

While there has been described what is at present considered to be the preferred embodiment of the invention, the description is for illustrative purposes only, and it should be distinctly understood that changes and variations may be made within the spirit or scope of the claims.

What is claimed is:

1. A vehicle head lamp comprising:
    a lamp body having a front side being opened;
    a lens mounted on the front side of the lamp body;
    a discharging lamp;
    a reflector being disposed within a space defined by the lamp body and the lens while supporting the discharging lamp, the reflector being tiltable with respect to the lamp body;
    a discharging lamp unit supplying a discharging voltage to the discharging lamp; and
    a connecting member including:
        at least two connection cords connecting the discharging lamp and the discharging lamp unit, wherein one of the connection cords is a high voltage cord to which a high voltage is applied,
        a protecting tube covering the high voltage cord, and
        a cylindrical member being conductive and flexible, wherein the cylindrical member covers the protecting tube and at least one connection cord which is not covered with the protecting tube, and
        further wherein a gap is formed between the cover layer of the high voltage cord and the protecting tube, and a second gap is formed between the protecting tube and the cylindrical member.

2. The vehicle head lamp according to claim 1, wherein the outside diameter of the high voltage cord is smaller than the inside diameter of the protecting tube.

3. The vehicle head lamp according to claim 1, wherein the protecting tube is made of polyethylene.

4. The vehicle head lamp according to claim 1, wherein each of the connection cords has a covering layers made of polyethylene.

5. The vehicle head lamp according to claim 1, wherein the cylindrical member is formed by weaving conductive metal wires in a mesh.

6. The vehicle head lamp according to claim 1, further comprising:

an auto-leveling actuator for moving the reflector to be tilted.

7. A vehicle head lamp comprising:

a discharging lamp;

a discharging lamp unit supplying a discharging voltage to the discharging lamp; and a connecting member including:

at least two connection cords connecting the discharging lamp and the discharging lamp unit, wherein one of the connection cords is a high voltage cord to which a high voltage is applied, a protecting tube covering the high voltage cord, and a cylindrical member being conductive and flexible, wherein the cylindrical member covers the protecting tube and at least one connection cord which is not covered with the protecting tube, and further wherein a gap is formed between the covering layer of the high voltage cord and the protecting tube.

8. The vehicle lamp according to claim 7, wherein a second gap is formed between the protecting tube and the cylindrical member.

9. A vehicle head lamp comprising:

a discharging lamp;

a discharging lamp unit supplying a discharging voltage to the discharging lamp; and a connecting member including:

at least two connection cords connecting the discharging lamp and the discharging lamp unit, wherein one of the connection cords is a high voltage cord to which a high voltage is applied, a protecting tube covering the high voltage cord, and a cylindrical member being conductive and flexible, wherein the cylindrical member covers the protecting tube and at least one connection cord which is not covered with the protecting tube, and further wherein a gap is formed between the protecting tube and the cylindrical member.

10. The vehicle head lamp according to claim 9, wherein the protecting tube is made of polyethylene.

11. The vehicle head lamp according to claim 9, further comprising:

a lamp body having a front side being opened; and a lens mounted on the front side of the lamp body.

12. The vehicle head lamp according to claim 11, further comprising:

a reflector being disposed within a space defined by the lamp body and the lens while supporting the discharging lamp, the reflector being tiltable with respect to the lamp body.

13. The vehicle head lamp according to claim 12, further comprising:

an auto-leveling actuator for tilting the reflector.

* * * * *